June 11, 1963 A. W. ORLACCHIO 3,093,759
ACCELEROMETER
Filed Oct. 22, 1958
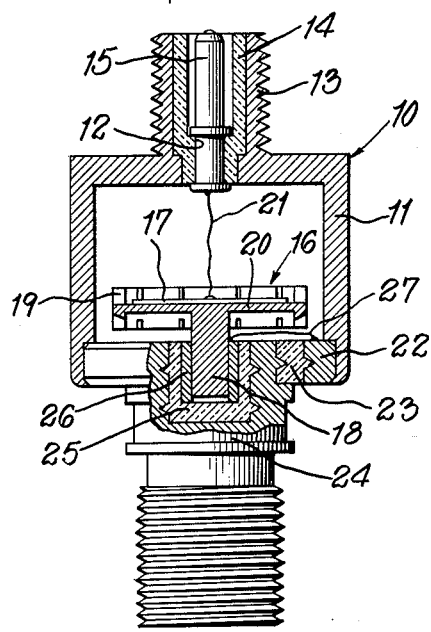
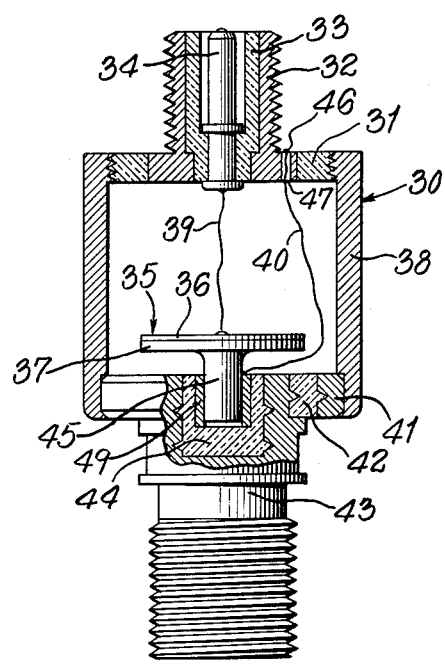
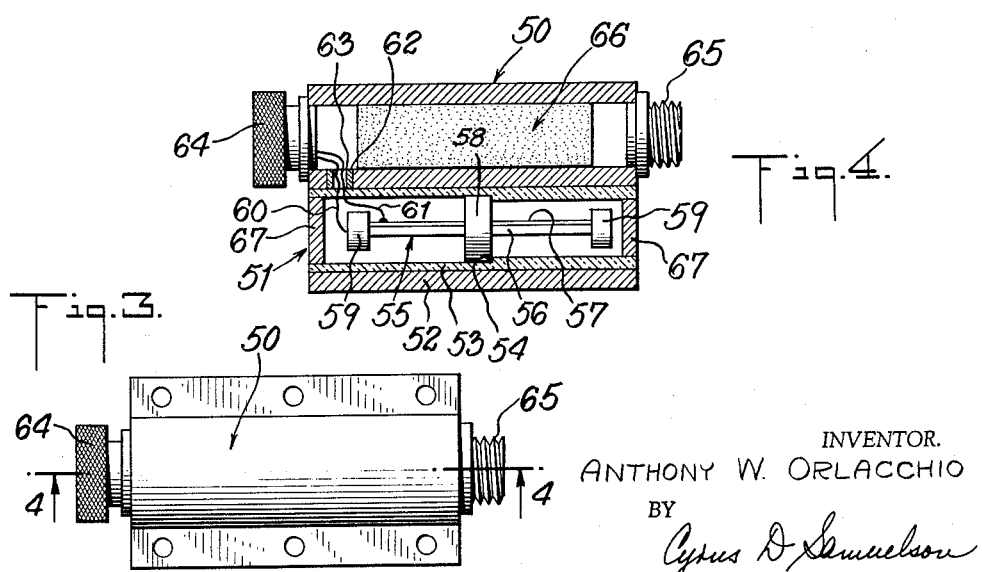
INVENTOR.
ANTHONY W. ORLACCHIO
BY
*Cyrus D. Samuelson*
ATTORNEY

United States Patent Office 3,093,759
Patented June 11, 1963

3,093,759
ACCELEROMETER
Anthony W. Orlacchio, Fords, N.J., assignor to Gulton Industries, Inc., Metuchen, N.J., a corporation of New Jersey
Filed Oct. 22, 1958, Ser. No. 768,975
12 Claims. (Cl. 310—8.4)

My invention relates to accelerometers and in particular to those accelerometers in which the electromechanically sensitive element is ungrounded, that is, it is not electrically connected to the device under test.

The more common type of prior art accelerometers are the so-called grounded units. In these devices one side of the active electromechanically sensitive element is electrically connected to the accelerometer housing and mounting stud and thence to the device being tested (ground). Due to the fact that there are varying ground potentials, ground loop currents are generated resulting in electrical noise. This noise serves to mask the mechanical phenomena being observed due to the fact that false accelerometer readings are observed on the measurement indicator.

To overcome this inherent defect in grounded accelerometers, resort has been made to placing an insulating plate between the accelerometer mounting stud and the device under test. For this purpose, glass-bonded mica insulators produced and marketed under the trademark Mycalex by Mycalex Corporation of America are used. However, it has not always been convenient or possible to place such an insulating plate in all installations and it has been deemed desirable to use an accelerometer in which the sensitive element is electrically insulated from the mounting stud and from the device whose acceleration is being measured. Such units are referred to as ungrounded accelerometers.

It is an important object of my invention to provide an ungrounded accelerometer with high sensitivity and low noise level.

It is a further object of my invention to provide such an accelerometer which is economical and simple to produce.

These and other objects, features and advantages of my invention will be apparent during the course of the following description when taken in connection with the accompanying drawings wherein:

FIGURE 1 is an elevational view, partly in cross-section, of a preferred form of accelerometer of my invention, FIGURE 2 is a view similar to FIGURE 1 of a modified form of accelerometer of my invention, FIGURE 3 is a plan view of a further modified form of accelerometer of my invention, and FIGURE 4 is a cross-sectional view, partly in elevation, taken on line 4—4 of FIGURE 3.

Broadly, my invention is directed toward effectively insulating the electromechanically sensitive active element from the device whose acceleration is being measured while still maintaining the proper mechanical and electrical relationships necessary in the production of efficient accelerometers. I accomplish this by using a glass-bonded mica insulator, known as Mycalex and produced and marketed by the Mycalex Corporation of America, to insulate the active element from the case (FIGURE 4) or to insulate the outer housing from the mounting stud (FIGURES 1 and 2).

I have chosen this particular insulator because it retains its characteristics at temperatures up to 600° F. and because its coefficient of expansion lies between those of stainless steel and titanium, both of which metals are commonly used in accelerometers of my invention. Furthermore, the difference between its coefficient of expansion and that of either of the metals is not graet enough to cause spreading at the temperatures at which these accelerometers are operative.

While I prefer to use piezoelectric ceramic elements formed largely of the metallic titanates such as lead titanate-zirconate or barium titanate as the electromechanically sensitive body in accelerometers of my invention, I do not wish to be limited thereto because it will be obvious to those skilled in the art that other electromechanically sensitive bodies may also be used.

In the drawings, wherein, for the purpose of illustration, are shown preferred embodiments of my invention, the numeral 10 generally designates an accelerometer of my invention. Accelerometer 10 is generally comprised of cylindrical housing 11 of stainless steel, titanium or similar material with an opening 12 in its upper base. Projection 13 of the same material as housing 11 and which may be unitary therewith surrounds opening 12. Within projection 13 is placed insulating sleeve 14 of Mycalex glass-bonded mica or similar material which is molded to projection 13. Conductive pin 15 is mounted within insulating sleeve 14 so as to be fixedly held therein and insulated from projection 13 and housing 11. The active unit has been generally designated 16 and comprises electromechanically sensitive element 17 of piezoelectric ceramic in the shape of a flat disc mounted on metallic disc 20 to the center of which is affixed metallic rod 18. Rod 18 and disc 20 are preferably formed of a single piece of stainless steel but they may be of different material and made of two pieces which are welded or otherwise bonded together. Element 19 around the periphery of disc 20 serves to mass load active unit 16.

The lower base of accelerometer 10 is made up of a series of rings. The outer ring 22 is formed of the same material as housing 11 and is suitably bonded thereto. Ring 23 is adjacent to ring 22, is formed of Mycalex glass-bonded mica and is suitably molded thereto. Mounting stud 24 of titanium or similar material is within ring 23 and molded thereto. Mounting stud 24 has an opening in its upper portion into which is fitted Mycalex insulator 25 in the shape of a hollow cylinder. Insulator 25 is molded to mounting stud 24. Within insulator 25 and molded thereto is stainless steel hollow cylinder 26. Suitably fitted into the opening in cylinder 26 is rod 18 which is press fit, welded or otherwise affixed to cylinder 26. Lead 27 makes electrical connection from rod 18 (the ground side of element 17) and lead 21 makes electrical connection from the high side of element 17 to pin 15. It can be seen that if a suitable connector is threaded onto projection 13, electrical connection is made through leads 27 and 21 to an external circuit (not shown). For example, such a connector could be one in which the inner conductor made contact with pin 15 and the outer shield made contact with projection 13.

The operation of the accelerometer of FIGURE 1 is as follows: accelerometer 10 is mounted by means of mounting stud 24 on the device whose acceleration is being measured and electrical connection is made to pin 15 and projection 13. When the test device vibrates it causes rod 18 to move thereby causing disc 20 to bend. This causes element 17 to be stressed mechanically and to generate an electrical voltage which is detected in the external circuit connected to pin 15 and projection 13. For a more detailed explanation of this operation, reference is made to United States Patent 2,808,522 to Abraham I. Dranetz.

In FIGURE 2, the numeral 30 generally designates an alternative embodiment of accelerometer produced in accordance with the teachings of my invention. Accelerometer 30 is substantially formed in the shape of a hollow cylindrical housing 38 with an opening in its upper base.

Housing 38 is formed of stainless steel, titanium or similar material. Ring 31 of Mycalex glass-bonded mica forms the part of the upper base adjacent to housing 38. Ring 31 is suitably affixed to housing 38. Next to and suitably affixed to ring 31 is flanged hollow cylinder 32 of stainless steel or similar material which carries opening 47 therein. Within flanged cylinder 32 and affixed thereto is insulating sleeve 33 of glass-bonded mica. Conductive pin 34 is mounted within insulating sleeve 33 so as to be fixedly held therein and insulated from housing 38 and flanged cylinder 32. The active unit of accelerometer 30 is generally designated 35 and comprises piezoelectric ceramic disc 36 which is bonded to metallic disc 37 which is suitably affixed to stainless steel rod 45. Disc 37 and rod 45 are of dimensions which serve to mass load disc 36.

The lower base of accelerometer 30 is made up of outer ring 41 which is suitably bonded to housing 38 and is preferably formed of the same material. Ring 42 is formed of Mycalex glass-bonded mica and is adjacent to ring 41 and suitably molded thereto. Mounting stud 43 of titanium or similar material is within ring 42 and molded thereto. Mounting stud 43 has an opening in its upper portion into which is fitted Mycalex insulator 44 in the shape of a hollow cylinder. Within insulator 44 and molded thereto is stainless steel hollow cylinder 49. Suitably fitted into the opening in cylinder 49 is rod 45 which may be welded, press fit or otherwise affixed to cylinder 49. Lead 39 makes electrical connection from the high side of element 36 to conductive pin 34 and lead 40 is carried from rod 45 (the ground side of element 36) through opening 47 in the flange of cylinder 32 to make electrical connection to cylinder 32 at 46. The same type connector may be used to make electrical contact to accelerometer 30 as is used for accelerometer 10. The operation of accelerometer 30 is similar to that described for accelerometer 10.

In FIGURES 3 and 4, there is shown a still further embodiment of accelerometer of my invention. This accelerometer is generally designated 50. Accelerometer 50 comprises two chambers, generally designated 51 and 66. Chamber 66 contains either the usual cathode follower and other circuitry or an emitter follower such as has been described in application of Leonard Weiss, filed of even date herewith, and assigned to the assignee hereof.

Chamber 51 comprises outer metallic housing 52 of stainless steel, titanium or similar material whose inner surface is substantially cylindrical. Within housing 52 and molded thereto is glass-bonded mica insulating sleeve 53 with ridge 54 thereon. The active piezoelectric element 57 is affixed to metal strip 56 which is mass-loaded at its ends by masses 59 and is supported at its center by armature or hub 58. Armature 58 is force-fitted in sleeve 53 and is held in place by ridge 54. End caps 67 of the same material as housing 52 serve to seal chamber 50.

Opening 63 is provided in housing 52 into which is inserted insulating sleeve 62 of glass-bonded mica or similar material. Electrical lead 61 from the high side of element 57 and electrical lead 60 from the ground side of element 57 are fed through insulating sleeve 62 to the connector which is shown covered by cap 64.

The connector, which is covered by cap 64, is utilized for calibration purposes and when the cap which is shown in the figures is removed, the circuit lead 60 and the amplifier ground circuit is opened. A calibrating voltage is then applied to the system so that the accelerometer system may be calibrated. After the system has been calibrated, cap 64 is replaced on the connector. Cap 64 is wired so that when it is in place on the connector, the circuit is closed between lead 60 and the amplifier ground.

Connector 65 is utilized to supply power to the amplifier and for making connection from the output of the system to the external metering and measuring circuits (not shown). I have used the word amplifier in the above description but I intend to include in the definition of the word amplifier: cathode followers with gains equal to, greater or less than one and emitter followers such as those described in the application of Leonard Weiss to which I have referred heretofore as well as those amplifiers which are usual in the art.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. An accelerometer comprising a housing, a mess-loaded electromechanically sensitive body, means for making at least two electrical connections from said body to an external circuit, means for mounting said housing to the apparatus whose acceleration is under measurement affixed to said housing, at least a portion of said housing being formed of electrically conductive material, said electromechanically sensitive body being mounted within said housing and electrically insulated therefrom and means for electrically insulating said conductive portion of said housing from said mounting means.

2. An accelerometer comprising a housing, a rod and a substantially flat disc attached thereto, an electromechanically sensitive body affixed to said disc, said housing being substantially cylindrical and comprising an outer electrically conductive shell carrying an opening in the upper base thereof, a projection of said outer shell surrounding said opening in said upper base, an insulating sleeve within said projection and affixed thereto, a conductive pin within said insulating sleeve and affixed thereto whereby said conductive pin is insulated from said outer shell, the lower base of said cylinder comprising an outer ring of conductive material affixed to said outer shell, an inner ring of insulating material affixed to said outer ring, a mounting stud carrying an opening in the upper end thereof and affixed to said inner insulating ring, an insulator substantially cylindrical in form within said mounting stud opening and affixed to said mounting stud, an electrically conductive element substantially cylindrical in form within said substantially cylindrical insulator and affixed thereto, said rod mounted within said cylindrical conductor and affixed thereto, means for making electrical connection from said rod to said outer ring and means for making electrical connection from said electromechanically sensitive body to said conductive pin.

3. An accelerometer comprising a housing, a rod and a substantially flat disc attached thereto, an electromechanically sensitive body affixed to said disc, said housing being substantially cylindrical and comprising an outer electrically conductive shell carrying an opening in the upper base thereof, an insulating ring within said opening and bonded to said housing, a metallic hollow cylinder with an outward flange at its lower base, said flange carrying an opening therein, said flange being bonded to said insulating ring, an insulating sleeve within said metallic hollow cylinder and affixed thereto, a conductive pin within said insulating sleeve and affixed thereto whereby said conductive pin is insulated from said outer shell, the lower base of said housing comprising an outer ring of conductive material affixed to said outer shell, an inner ring of insulating material affixed to said outer ring, a mounting stud carrying an opening in the upper end thereof and affixed to said inner insulating ring, an insulator substantially cylindrical in form within said mounting stud opening and affixed to said mounting stud, an electrically conductive element substantially cylindrical in form with its upper base removed within said substantially cylindrical insulator and affixed thereto, said rod being mounted within said cylindrical conductor and affixed thereto, means for making electrical connection from said rod carried through said opening in said flange and electrically connected to said flange and means for making electrical connection from said electromechanically sensitive body to said first conductive pin.

4. An accelerometer comprising a hollow housing of electrically conductive material, the inner surface of said housing being substantially cylindrical in form, said housing carrying an opening therein, an electric insulating sleeve within said opening, an electrical insulating hollow cylinder located in and affixed to the inner surface of said housing, the inner surface of said insulating hollow cylinder carrying a ridge thereon, an electrically conductive strip, a thin electromechanically sensitive body mounted on said conductive strip, a mass at each end of said strip, a hub at substantially the center of said conductive strip, said hub being contained within said insulating hollow cylinder such that said hub is in contact with said ridge, means for making electrical connections to said electromechanically sensitive body, said means for making electrical connections being carried outside of said housing through said insulating sleeve.

5. An accelerometer comprising, a mass-loaded electromechanically sensitive body including an electrically conductive member, an electromechanically sensitive element having electrodes and mounted on said member and an electrically conductive support for said member for vibrating and flexing said member and element, an electrically conductive housing enclosing said electromechanically sensitive body, means for securing said electrically conductive support to said electrically conductive housing for vibrating said electromechanically sensitive body as the housing is vibrated and including electrical insulating means for electrically insulating said electromechanically sensitive body from said electrically conductive housing, and means for making electrical connections from the electrodes of said electromechanically sensitive element to an external circuit.

6. An accelerometer comprising, a mass-loaded electromechanically sensitive body including an electrically conductive member, an electromechanically sensitive element having electrodes and mounted on said member and an electrically conductive support for said member for vibrating and flexing said member and element, an electrically conductive mounting means adapted to be secured to an apparatus whose acceleration is to be measured, means for securing said electrically conductive support to said electrically conductive mounting means for vibrating said electromechanically sensitive body as the mounting means is vibrated and including electrical insulating means for electrically insulating said electromechanically sensitive body from said electrically conductive mounting means, and means for making electrical connections from the electrodes of said electromechanically sensitive element to an external circuit.

7. An accelerometer comprising, a mass-loaded electromechanically sensitive body including an electrically conductive member, an electromechanically sensitive element having electrodes and mounted on said member and an electrically conductive support for said member for vibrating and flexing said member and element, an electrically conductive mounting means adapted to be secured to an apparatus whose acceleration is to be measured, means for securing said electrically conductive support to said electrically conductive mounting means for vibrating said electromechanically sensitive body as the mounting means is vibrated and including electrical insulating means for electrically insulating said electromechanically sensitive body from said electrically conductive mounting means, an electrically conductive housing enclosing said electromechanically sensitive body, means for securing said electrically conductive housing to said electrically conductive mounting means and including electrical insulating means for electrically insulating said electrically conductive housing from said electrically conducting mounting means, and means for making electrical connections from the electrodes of said electromechanically sensitive element to an external circuit.

8. An accelerometer comprising a housing, a mass-loaded electromechanically sensitive body, means for making at least two electrical connections from said body to an external circuit, means for mounting said housing to the apparatus whose acceleration is under measurement affixed to said housing, at least a portion of said housing being formed of electrically conductive material, said electromechanically sensitive body being mounted within said housing and electrically insulated therefrom.

9. An accelerometer comprising a rod, a substantially flat disc attached thereto, an electromechanically sensitive body affixed to said disc, a substantially cylindrical housing having an upper base, a lower base and an electrically conductive outer shell, the lower base of said housing including an electrical insulating ring carried by the outer shell, an electrically conductive mounting stud carried by the electrical insulating ring and having an opening therein, an electrical insulator in the opening in the mounting stud and receiving said rod therein, and means for making electrical connections from said electromechanically sensitive body to an external circuit.

10. An accelerometer comprising a rod, a substantially flat disc attached thereto, an electromechanically sensitive body affixed to said disc, a substantially cylindrical housing having an upper base, a lower base and an electrically conductive outer shell, the lower base of said housing including an electrical insulating ring carried by the outer shell, an electrically conductive mounting stud carried by the electrical insulating ring and having an opening therein, an electrical insulator in the opening in the mounting stud and receiving said rod therein, the upper base of said housing being electrically conductive and having an opening therein and an upwardly extending connector projection about said opening, an electrical insulator in said connector projection and having an electrically conductive connector pin therein, and means for making electrical connections from said electromechanically sensitive body to the electrically conductive portion of said housing and said connector pin for electrical connection to an external circuit.

11. An accelerometer comprising a rod, a substantially flat disc attached thereto, an electromechanically sensitive body affixed to said disc, a substantially cylindrical housing having an upper base, a lower base and an electrically conductive outer shell, the lower base of said housing including an electrical insulating ring carried by the outer shell, an electrically conductive mounting stud carried by the electrical insulating ring and having an opening therein, an electrical insulator in the opening in the mounting stud and receiving said rod therein, the upper base of said housing including an insulating ring carried by the outer shell, an electrically conductive member carried by the insulating ring and having an opening therein and an upwardly extending connector projection about said opening, an electrical insulator in said connector projection and having an electrically conductive connector pin therein, and means for making electrical connections from said electromechanically sensitive body to said electrically conductive member and said connector pin for electrical connection to an external circuit.

12. An accelerometer comprising, an electrically conductive hollow housing, the inner surface of said housing being substantially cylindrical, an electrical insulating hollow cylinder located in and affixed to the inner surface of said housing, the inner surface of said insulating hollow cylinder having a ridge thereon, a mass-loaded electromechanically sensitive body located in said insulating hollow cylinder and including an electrically conductive strip, an electromechanically sensitive element having electrodes and mounted on said strip and an electrically conductive hub supporting said strip, said hub being secured in said insulating hollow cylinder against said ridge, and means for making electrical connections from the electrodes of said electromechanically sensitive element to an external circuit.

References Cited in the file of this patent

UNITED STATES PATENTS

| | | |
|---|---|---|
| 2,429,414 | Kuenstler | Oct. 21, 1947 |
| 2,464,046 | Kuenstler | Mar. 8, 1949 |
| 2,508,720 | Kuenstler | May 23, 1950 |
| 2,536,802 | Fehr et al. | Jan. 2, 1951 |
| 2,671,202 | Petroff | Mar. 2, 1954 |
| 2,714,672 | Wright et al. | Aug. 2, 1955 |
| 2,808,522 | Dranetz | Oct. 1, 1957 |

FOREIGN PATENTS

| | | |
|---|---|---|
| 747,008 | Germany | Sept. 4, 1944 |